United States Patent
Kakuta et al.

[11] Patent Number: 6,164,661
[45] Date of Patent: Dec. 26, 2000

[54] CYLINDER HEAD GASKET

[75] Inventors: Hirotaka Kakuta; Akio Sato; Kenji Uchida; Kazuya Nakata, all of Toyota, Japan

[73] Assignee: Taiho Kogyo Co., Ltd., Aichi, Japan

[21] Appl. No.: 09/043,798

[22] PCT Filed: Jul. 30, 1997

[86] PCT No.: PCT/JP97/02645

§ 371 Date: Mar. 24, 1998

§ 102(e) Date: Mar. 24, 1998

[87] PCT Pub. No.: WO98/04855

PCT Pub. Date: Feb. 5, 1998

[30] Foreign Application Priority Data

Jul. 31, 1996 [JP] Japan ................................ 8-217821

[51] Int. Cl.[7] .................................................... F16J 15/08
[52] U.S. Cl. ........................ 277/591; 277/298; 277/593; 277/591; 219/117.1; 219/87
[58] Field of Search ................................ 277/598, 593, 277/591; 219/117.1, 87

[56] References Cited

FOREIGN PATENT DOCUMENTS 7-332500  12/1995  Japan .

*Primary Examiner*—Anthony Knight
*Assistant Examiner*—Enoch Peavey
*Attorney, Agent, or Firm*—Flynn, Thiel, Boutell & Tanis, P.C.

[57] ABSTRACT

A cylinder head gasket 1 includes a shim ring 5 which surrounds a combustion chamber opening 2A in a gasket body 2. The shim ring is circumferentially spot welded along weld lines 5a, 5b. The weld spacing of the spot welding is varied to provide zones $H_1$, $H_2$ and $H_3$ of high welding density and zone of a low welding density. The weld spacing in the zone of high welding density is such that a distortion in the shim ring is produced under the influence of heat generated during the welding operation if the weld spacing is used around the full circumference of the shim ring for spot welding. However, by interposing a zone of a low welding density, a distortion in the shim ring can be prevented while increasing the welding strength.

6 Claims, 2 Drawing Sheets

CYLINDER HEAD GASKET

FIELD OF THE INVENTION

The invention relates to an improvement of a cylinder head gasket of an engine.

BACKGROUND OF THE INVENTION

A cylinder head gasket is known in the art comprising a gasket body having a combustion chamber opening formed in alignment with a cylinder bore, and a shim ring surrounding the combustion chamber opening, the shim ring being spot welded along a circumferentially extending weld line to the gasket body (Japanese Laid-Open Patent Application No. 293,700/1995).

The spacing of the spot weldings is chosen so as to enable the shim ring to be firmly welded to the gasket body. With a recent trend toward achieving a higher output from the engine, the spacing of the spot weldings need be reduced. However, this causes a distortion to be produced in the shim ring under the influence of heat generated during the welding operation. Thus there has been a definite limit on the spacing of spot weldings which can be reduced.

DISCLOSURE OF THE INVENTION

In view of the foregoing, the invention provides a cylinder head gasket which allows a higher welding strength to be achieved, even with spot welding, than in the prior art without accompanying a distortion in a shim ring.

Thus, the invention relates to a cylinder head gasket comprising a gasket body having a combustion chamber opening formed in alignment with a cylinder bore, and a shim ring surrounding the combustion chamber opening, the shim ring being spot welded along a circumferentially extending weld line to the gasket body. In accordance with the invention, the pitch of spot welding or the weld spacing is varied to define a zone of a high welding density and a zone of a low welding density in the circumferential direction of the shim ring.

With the arrangement of the invention, the weld spacing in the zone of a low welding density can be set to a high value below which a distortion would occur in the shim ring when spot weldings are effected at such value of weld spacing around the entire circumference of the shim ring. On the other hand, the weld spacing in the zone of a high welding density can be set to a low value which would cause a distortion to occur in the shim ring when spot weldings are effected at this low value of the weld spacing around the entire circumference of the shim ring.

Thus the occurrence of a distortion in the shim ring under the influence of heat can be prevented if the weld spacing in the zone of a high welding density is chosen to be a low value which would cause a distortion to occur in the shim ring under the influence of heat and if the weld spacing in the zone of a low welding density is chosen to be a high value below which a distortion would occur in the shim ring under the influence of heat. It will be evident that a shim ring for which welding took place with these weld spacings provides a higher welding strength than when spot weldings took place with a high value of weld spacing around the entire circumference.

BEST MODE OF CARRYING OUT THE INVENTION

The invention will be described below with reference to an embodiment which is applied to the cylinder head gasket of a tandem six cylinder engine.

Figure 1:
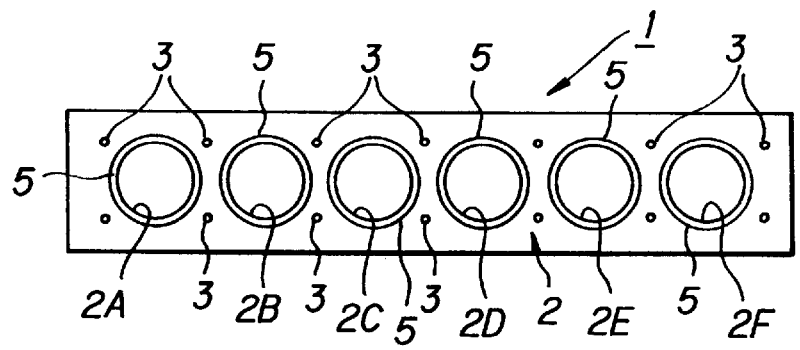
FIG. 1 is a plan view of a cylinder head according to one embodiment of the invention.

Referring to FIG. 1, a cylinder head gasket 1 includes a gasket body 2 formed of a relatively thick metal member. The gasket body 2 is formed with six combustion chamber openings 2A to 2F, located on a line and at an equal interval, in alignment with cylinder bores in the cylinder head, not shown.

Bolt holes 3 are formed in the gasket body 2 at a plurality of locations around the combustion chamber openings 2A to 2F for passing clamping bolts therethrough which connect between the cylinder head, not shown, and the cylinder block.

The gasket body 2 need not be constructed with a single plate, but may comprise a plurality of plates laminated together.

Figure 2:
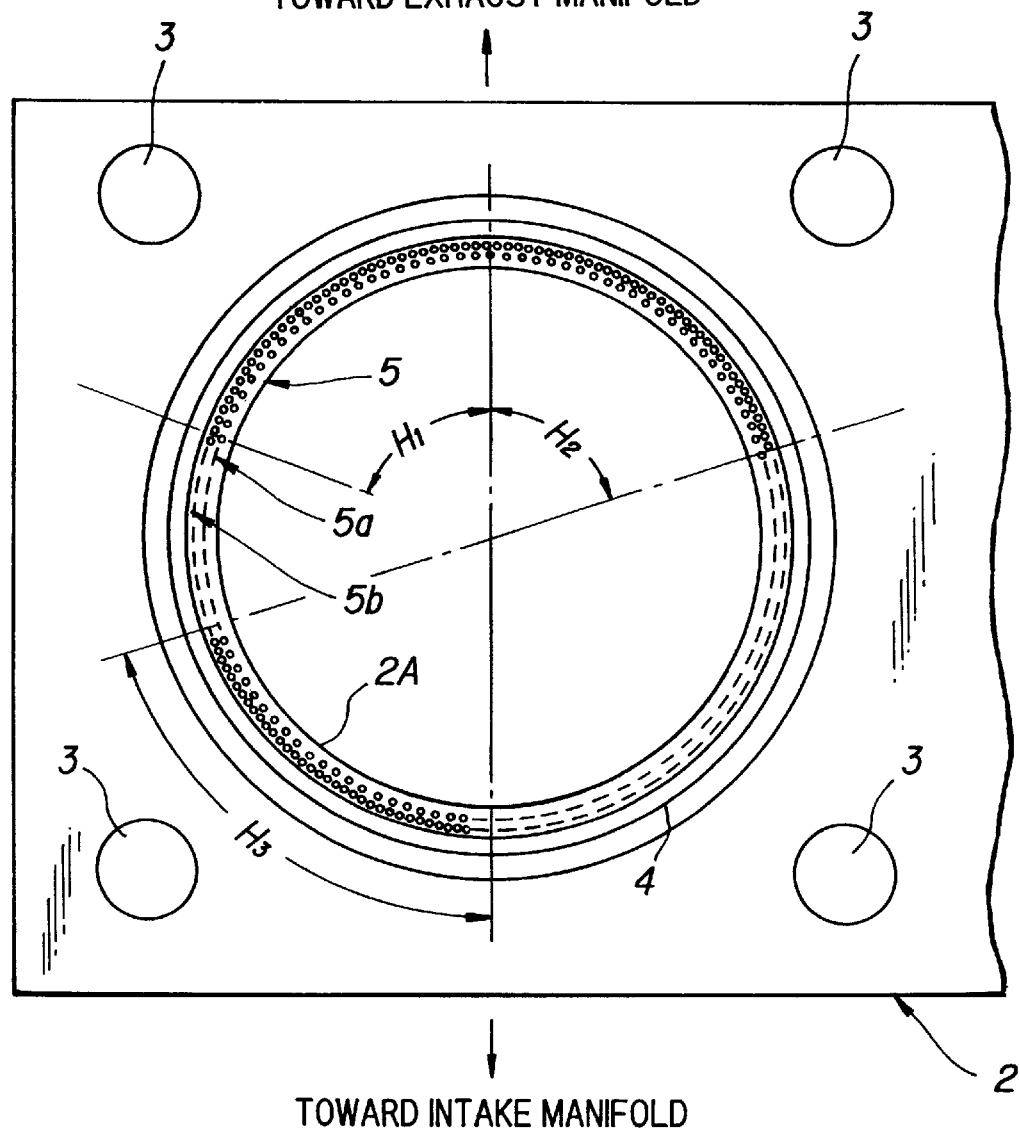
FIG. 2 is an enlarged view of the left end shown in FIG. 1.
Figure 3:
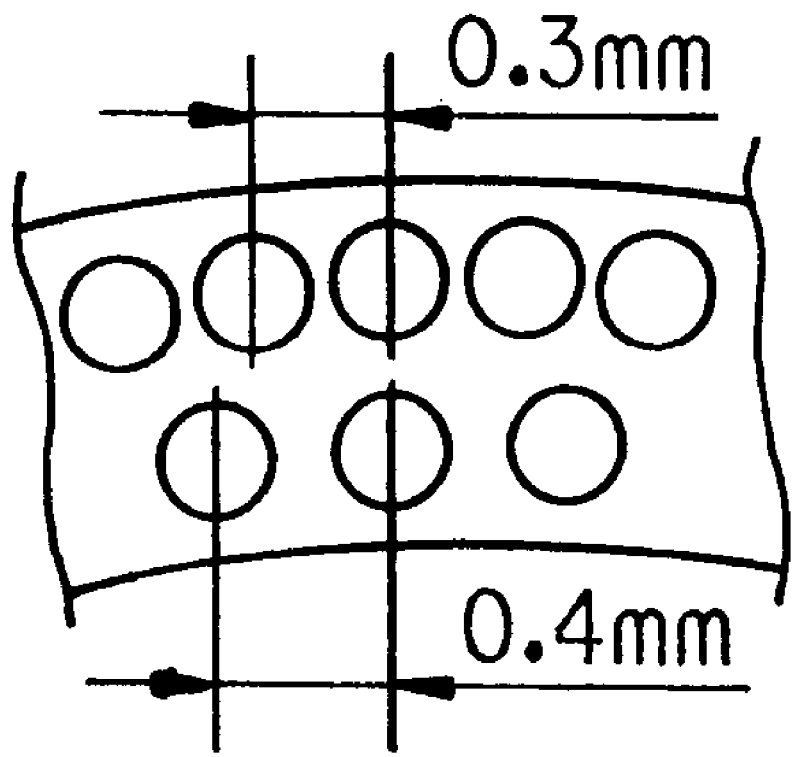
FIG. 3 is an enlarged view of spot weldings which take place in a zone of a high welding density.

As shown to an enlarged scale in FIG. 2, beads 4 are formed around the combustion chamber openings 2A to 2F in the gasket body 2 in surrounding relationship therewith and project upwardly, with the top of the beads 4 resiliently abutting against the cylinder block. A shim ring 5 is disposed on the upper surface of the gasket body 2 inside the bead so as to surround each of the combustion chamber openings 2A to 2F. Each shim ring is spot welded, by means of a laser, to the gasket body 2 along circumfererntially extending weld lines 5a, 5b.

In the present embodiment, a high value of weld spacing, for example, 0.4 mm, is used for each of combustion chamber openings 2B, 2C, 2E and 2F located intermediate the end combustion chamber openings 2A and 2F to spot weld the respective associated shim ring along a pair of circumferentially extending concentric weld lines 5a, 5b. The weld spacing of 0.4 mm cannot cause a distortion in the shim ring 5 under the influence of heat generated during the welding operation.

On the other hand, for each shim ring 5 which surrounds each of outer combustion chamber openings 2A and 2F, the spot welding takes place with a high value of weld spacing equal to 0.4 mm along the inner weld line 5a. By contrast, for the spot welding along the outer weld line 5b, a low value of weld spacing, for example, a spacing of 0.3 mm, is employed over three circumferential zones $H_1$, $H_2$ and $H_3$ of each shim ring 5 while a high value of weld spacing equal to 0.4 mm is employed elsewhere. The weld spacing of 0.3 mm represents a weld spacing which would cause a distortion in the shim ring 5 under the influence of heat during the weld operation if this spacing is used around the entire circumference of the shim ring 5 for spot welding.

Thus, each shim ring 5 surrounding the combustion chamber openings 2A and 2F which are located outside includes zones $H_1$, $H_2$ and $H_3$ of high welding density and a remaining zone of a low welding density circumferentially.

It is known for a tandem multi-cylinder engine that a relative slip between the cylinder head and the shim ring 5 is generally higher at opposite lengthwise ends and lower toward the center. In addition, considering the shim rings 5 located at the opposite ends, the relative slip is higher between a portion of the shim ring located toward an exhaust manifold and the cylinder head than in the remainder. The relative slip is also somewhat higher in the middle region between an intake manifold and the bolt hole 3 which is located outwardly thereof or toward the end of the tandem six cylinder engine.

Accordingly, in the present embodiment, the first zone $H_1$ of a high welding density extends over about 70 degrees as measured from the center of the exhaust manifold toward the end of the engine. The second zone $H_2$ of a high welding density extends over about 70 degrees as measured from the center of the exhaust manifold toward the center of the engine. Thus, in this embodiment, the zones $H_1$ and $H_2$ of high welding density are mutually continuous, covering a total angular range of about 140 degrees centered about the center of the exhaust manifold and extending toward the end and the center of the engine. The third zone $H_3$ of high welding density extends over about 70 degrees from substantially the center of the intake manifold toward the end of the engine.

As mentioned above, the weld spacing of 0.3 mm is high enough to cause a distortion in the shim ring 5 under the influence of heat during the welding operation if this weld spacing is used around the full circumference of the shim ring 5 for spot welding. However, this weld spacing of 0.3 mm is not used around the full circumference of the shim ring 5 for spot welding, but is used only in the zones which are spaced from each other and which extend over 140 degrees and 70 degrees, respectively, while remaining zones are spot welded using a higher weld spacing of 0.4 mm, thus allowing a distortion in the shim ring 5 under the influence of heat during the welding operation to be prevented from occurring.

As a consequence, it will be evident that the welding strength can be increased in comparison to a conventional product which uses the welding spacing of 0.4 mm around the full circumference of the shim ring 5 for spot welding.

It should be understood that weld spacings of 0.4 mm and 0.3 mm are exemplary only, and that the weld spacing used depends on the material and the plate thickness of the shim ring 5. Depending on the weld spacing and the size of welded nuggets, adjacent welded nuggets may overlap each other.

In the described embodiment, the higher welding density is used only for the outer weld line 5b. However, the invention is not limited thereto, but the welding density along the inner weld line 5a may be chosen higher or the welding density along both the inner and the outer weld line 5a, 5b may be higher. Alternatively, a single weld line may be used.

The zones $H_1$, $H_2$ and $H_3$ of the high welding density are cited in the sequence of their importance. The zone $H_3$ of the lowest importance may be omitted. Alternatively, the second zone $H_2$ rather than the zone $H_3$ of the lowest importance may be omitted.

In the described embodiment, the invention is applied to the shim rings 5 which surround the combustion chamber openings 2A and 2F located at the opposite ends. However, the invention is not limited thereto, and the invention may be applied to the shim rings 5 which surround two end combustion chamber openings 2A, 2B and 2E, 2F on each side. Alternatively, the invention may be applied to all of the shim rings 5. It should also be understood that such variations are not limited in their application to the tandem six cylinder engine.

INDUSTRIAL AVAILABILITY

As described, the invention enables the welding strength to be increased and the reliability to be enhanced.

What is claimed is:

1. A cylinder head gasket including a gasket body having a combustion chamber opening formed therein in alignment with a cylinder bore, and a shim ring surrounding the combustion chamber opening, the shim ring being spot welded to the gasket body along a circumferentially extending weld line, wherein the weld spacing of the spot welding is varied to provide a zone of a high welding density and a zone of a low welding density in the circumferential direction of the shim ring, a said zone of high welding density corresponding to a portion of the shim ring which is subject to an increased heat shrinkage of a cylinder head and which is thus welded at the high welding density while the remainder is welded at the low welding density, the portion of the shim ring which is subject to an increased heat shrinkage being adjacent to an exhaust manifold.

2. A cylinder head gasket according to claim 1 in which the weld line comprises a pair of concentric weld lines, the weld spacing of the spot welding along at least one of the weld lines being varied to provide a zone of a high welding density and a zone of a low welding density in the circumferential direction of the shim ring.

3. A cylinder head gasket according to claim 1 in which the portion of the shim ring adjacent to the exhaust manifold lies in a zone extending over about 70 degrees from substantially the center of the exhaust manifold toward an end of an engine.

4. A cylinder head gasket according to claim 3 which the portion of the shim ring adjacent to the exhaust manifold lies in a zone extending over about 70 degrees from substantially the center of the exhaust manifold toward the center of the engine.

5. A cylinder head gasket according to claim 1 in which the portion of the shim ring which is subject to an increased heat shrinkage is a portion of the shim ring which is adjacent to an intake manifold.

6. A cylinder head gasket according to claim 5 in which the portion of the shim ring adjacent to the intake manifold lies in a zone extending over about 70 degrees from substantially center of the intake manifold toward an end of an engine.

* * * * *